Figure 1:
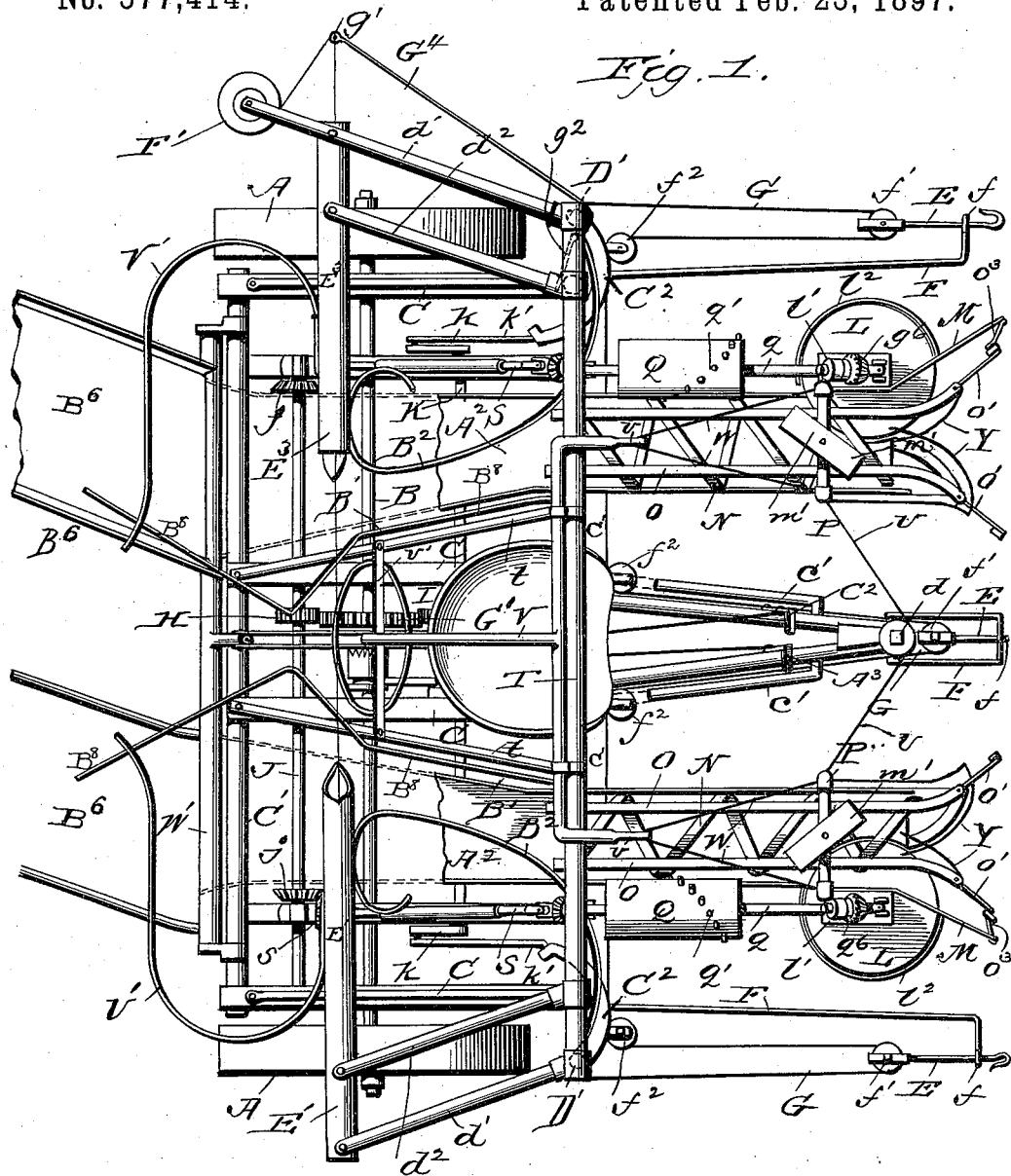

(No Model.) 7 Sheets—Sheet 1.

T. J. BROCKWAY.
CORN HARVESTER.

No. 577,414. Patented Feb. 23, 1897.

Witnesses
Inventor
T. J. Brockway
by Franklin H. Hough
Attorney (No Model.) 7 Sheets—Sheet 2.
T. J. BROCKWAY.
CORN HARVESTER.
No. 577,414. Patented Feb. 23, 1897.
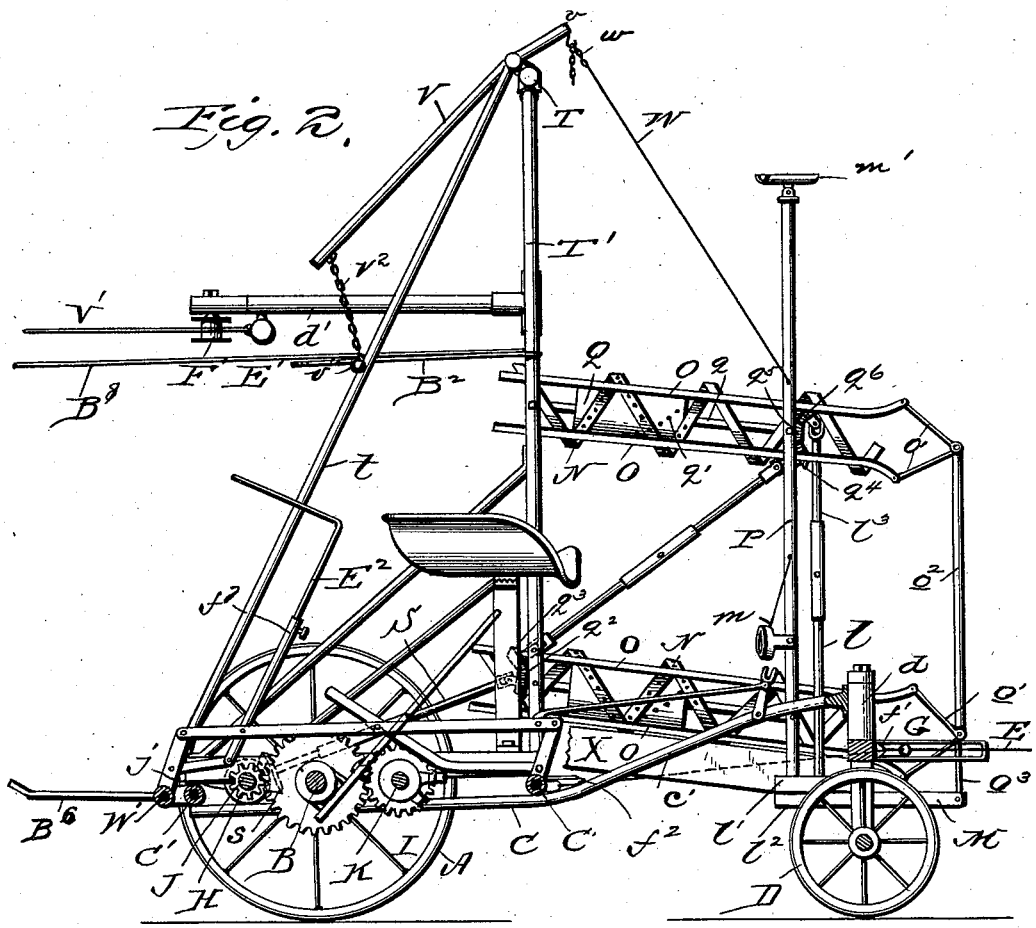
Fig. 2.
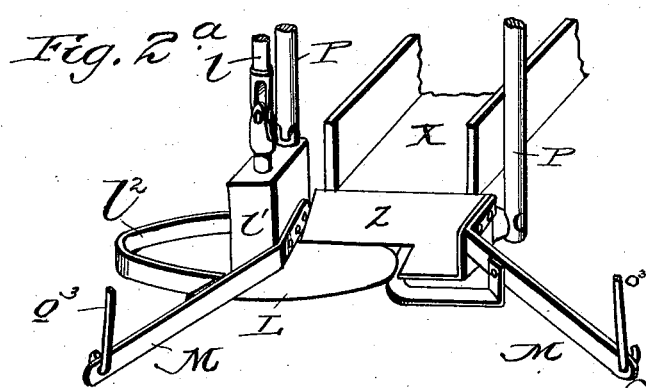
Fig. 2ª
Witnesses
Inventor
T. J. Brockway
Attorney

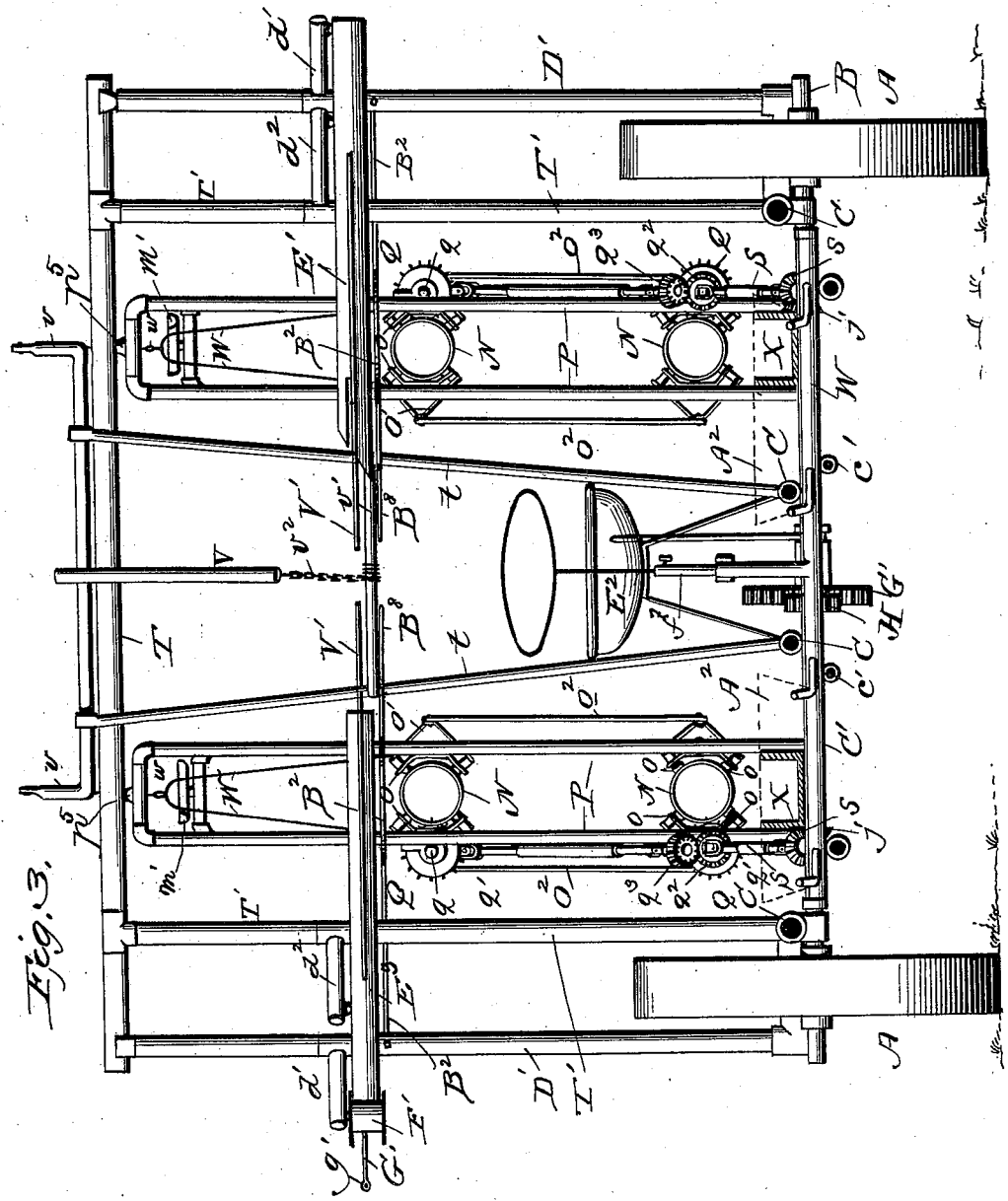

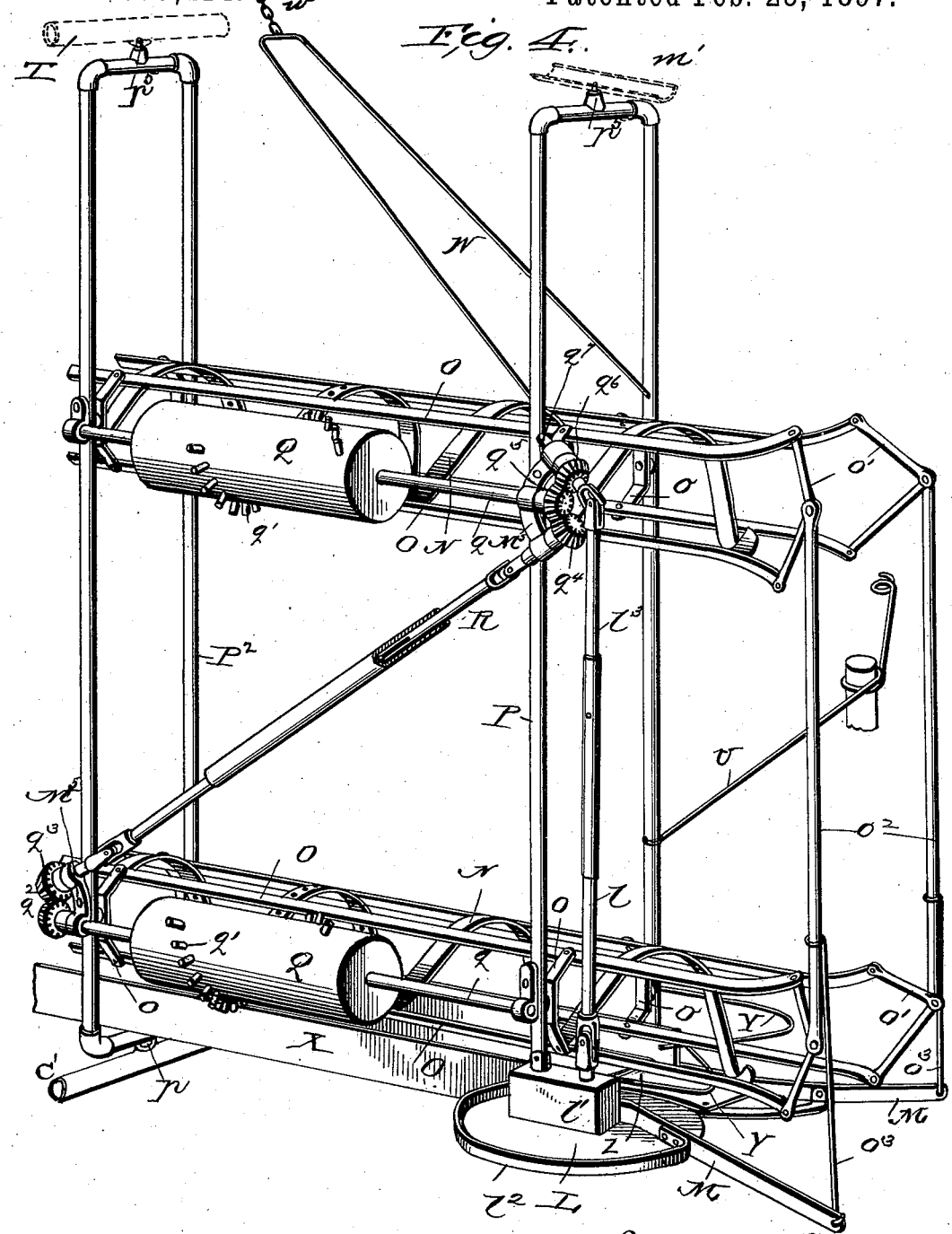

(No Model.) 7 Sheets—Sheet 5.
T. J. BROCKWAY.
CORN HARVESTER.
No. 577,414. Patented Feb. 23, 1897.
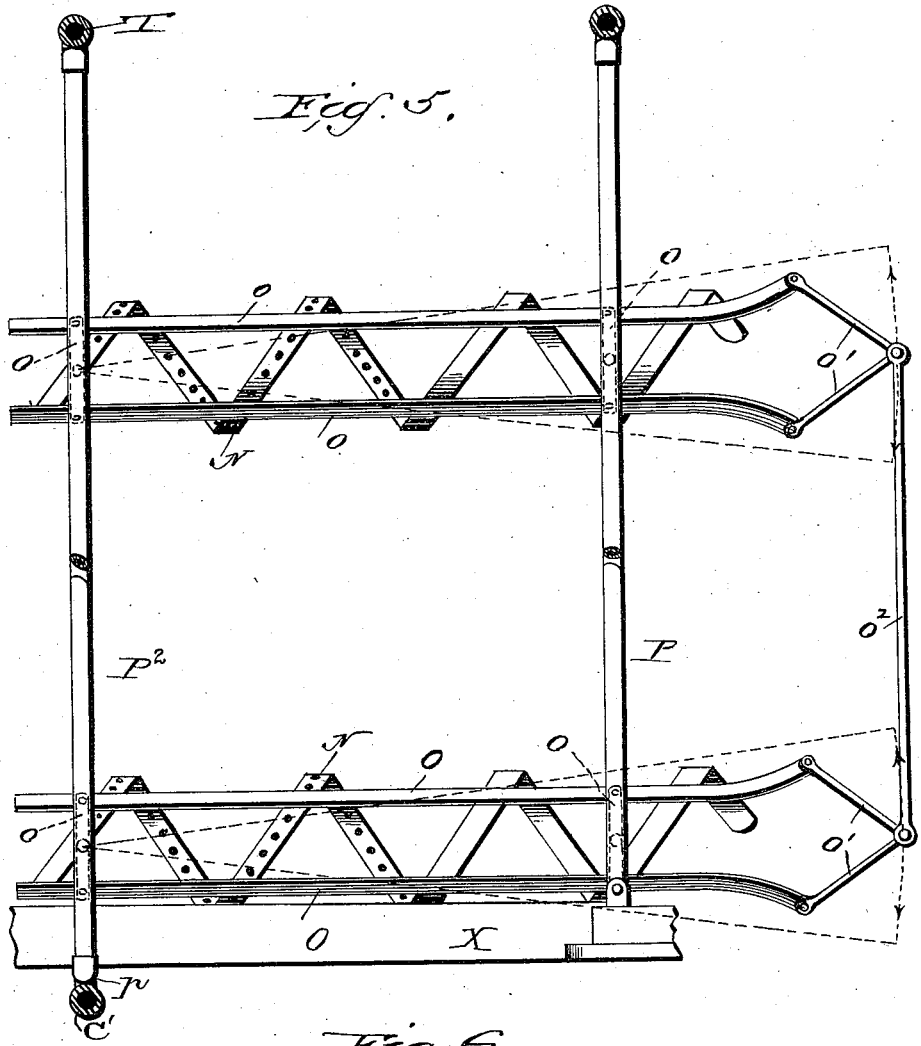
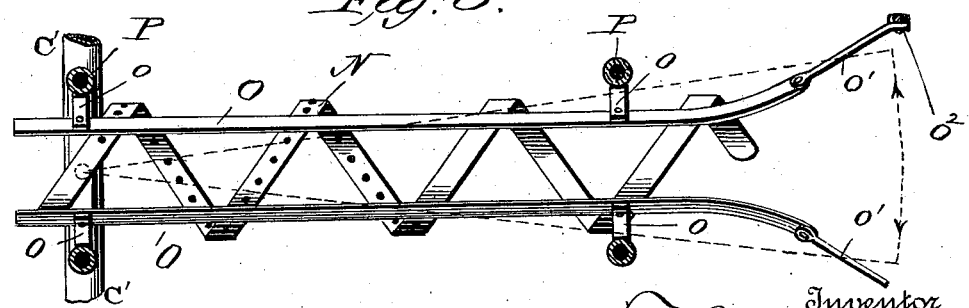

(No Model.)
7 Sheets—Sheet 6.
T. J. BROCKWAY.
CORN HARVESTER.
No. 577,414.   Patented Feb. 23, 1897.
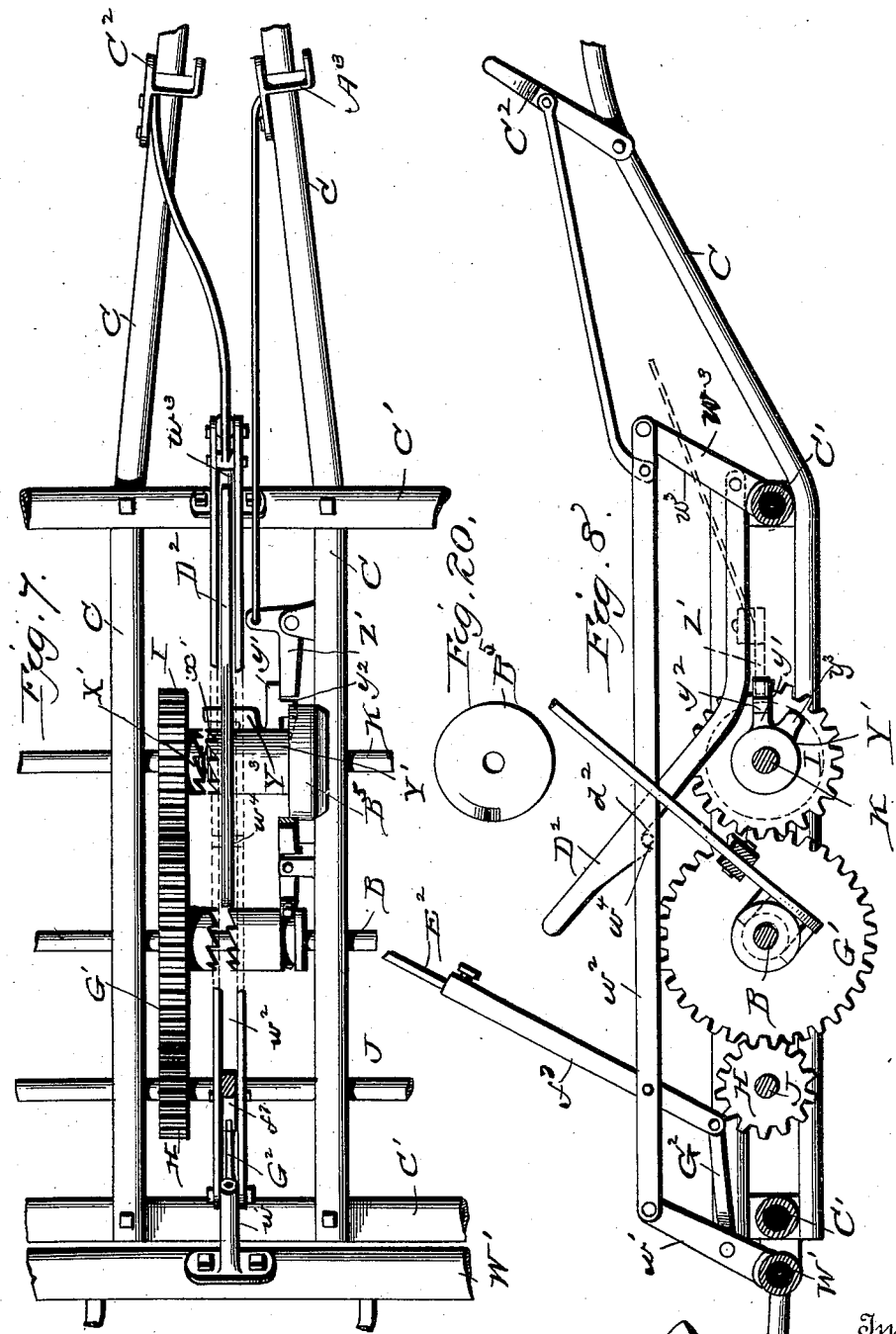

(No Model.) 7 Sheets—Sheet 7.
T. J. BROCKWAY.
CORN HARVESTER.
No. 577,414. Patented Feb. 23, 1897.
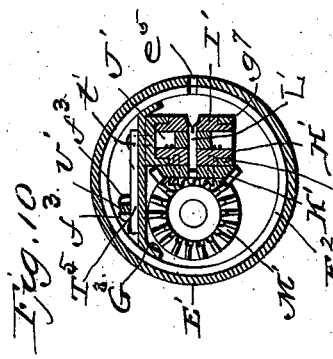
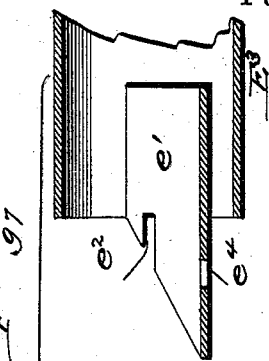
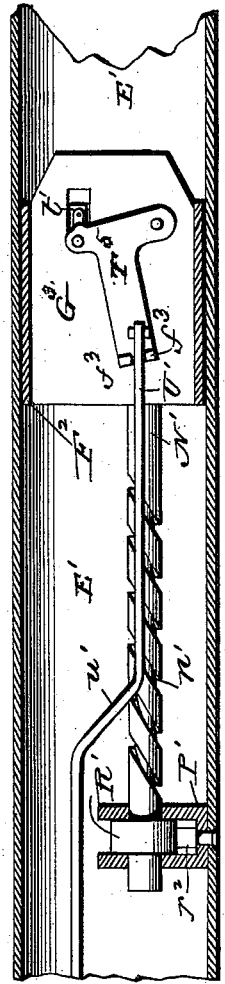
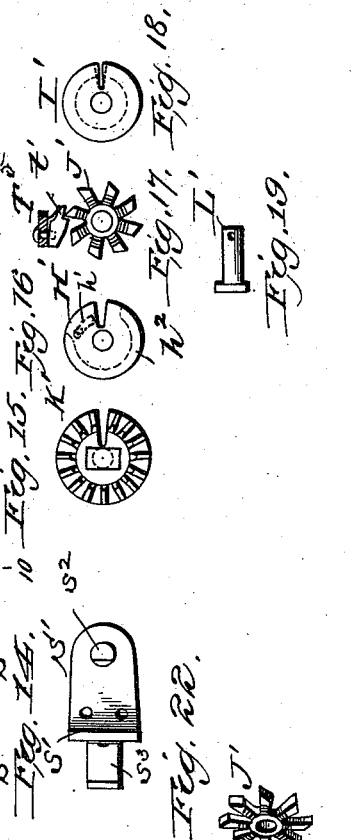
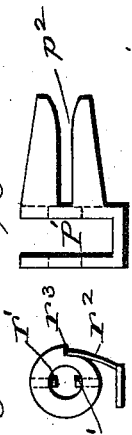
Witnesses
Inventor
T. J. Brockway,
by Franklin H. Hough
Attorney

UNITED STATES PATENT OFFICE.

TIFFANY J. BROCKWAY, OF EAGLE CHIEF, OKLAHOMA TERRITORY, ASSIGNOR TO THE BROCKWAY CORN HARVESTER COMPANY, OF OMAHA, NEBRASKA.

CORN-HARVESTER.

SPECIFICATION forming part of Letters Patent No. 577,414, dated February 23, 1897.

Application filed August 6, 1895. Serial No. 558,383. (No model.)

*To all whom it may concern:*

Be it known that I, TIFFANY J. BROCKWAY, a citizen of the United States, residing at Eagle Chief, in the county of "M," Oklahoma Territory, have invented certain new and useful Improvements in Corn-Harvesters; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to corn-harvesters of the class which cut and bind the corn into shocks; and the object of the invention is to improve upon the various mechanisms employed for performing the functions of machines of this class and to improve the machine as a whole, so that it shall be light, strong, and efficient.

To these ends and to such others as the invention may pertain, the same consists in the harvester and in the parts thereof having the construction hereinafter specified.

The invention is clearly illustrated in the accompanying drawings, which, with the letters of reference marked thereon, form a part of this specification, and in which—

Figure 1 is a plan view of a corn-harvester embodying my improvements. Fig. 2 is a central longitudinal section. Fig. $2^a$ represents an enlarged view of one of the cutters and the adjacent parts. Fig. 3 is a rear elevation with portions removed. Fig. 4 is a perspective view of one of the cutting and reel mechanisms. Fig. 5 is a detail side view of one of the reel mechanisms, illustrating its vertical adjustability. Fig. 6 is a plan view of the same, illustrating its horizontal adjustability. Fig. 7 is a plan view of the clutch mechanism for controlling the operation of the machine. Fig. 8 is a side view thereof. Fig. 9 is a horizontal section through a portion of one of the arms or bars carrying the wire-twisting devices. Fig. 10 is a cross-section of the same, taken on line 10 10 of Fig. 11. Fig. 11 is a longitudinal vertical section of the end portions of the two bars of the wire-twisting devices. Figs. 12 to 19, inclusive, are detail views of various parts of the wire-twisting devices; and Fig. 20 is a detail view of the rotary disk $B^5$. Fig. 21 is a perspective view of the disk H', and Fig. 22 is a similar view of the cutter J'.

Reference now being had to the details of the drawings by letter, A and A designate two carrying and driving wheels, of a construction common in harvesting machinery, that are mounted upon a shaft or axle B, through which movement is imparted to the various moving parts of the machine. Supported on the axle is the main frame, which, to secure both lightness and strength, is composed of several bars C C, extending from front to rear, and several bars C' C', extending parallel with the axle, suitable coupling devices being employed to connect the bars at the points at which they intersect. Preferably the bars are tubular or pipe form, although T or angle iron may be employed, if desired.

In addition to the wheels A A a third caster or guiding wheel D is provided at the front of the machine, being journaled in a head or bearing $d$, that is supported at the center of the machine by two forward extensions $c'$ from the central main-frame bars C.

The machine is designed to be drawn by three horses located, respectively, at each side and the center, a rod or bar E being provided at each of such points for the connection of the animal thereto. Each rod or bar passes loosely through an eye $f$ in a bar F, projecting forwardly from the machine, and carries on its rear end a pulley or sheave $f'$, over which a rope G, secured at its ends to the opposite sides of the main frame, passes. The portion of the rope between each side and the center draft-bar passes over a pulley or wheel $f^2$, secured to the front cross-bar C' of the main frame. The operation of the evener thus provided will be apparent without specific description.

At the transverse center there is mounted upon the axle B a gear-wheel G', that meshes with and drives two gear-wheels H and I, the former being secured to a shaft J, journaled in the rear of and parallel with the axle, and the latter to a shaft K in front of and parallel with said axle. The corn cutting and conveying mechanisms are actuated from the shaft J, while the binder mechanism is actuated from the shaft K. These mechanisms will be described in order.

The corn-cutters, of which there are two, located, respectively, at opposite sides of the machine in front, consist each of a revolving disk-form knife L, carried by a vertical shaft $l$, that is journaled in a block $l'$. Two corn-engaging guide-bars M and M diverge forward and laterally on opposite sides of the edge or side of the knife which does the cutting.

The knife L is revolved by connections with the shaft J, hereinafter specified. Preferably a curved guard-plate $l^2$ is placed around the outer non-cutting portion of the knife.

The reels for feeding or conveying the cut corn to the binder consist each of two parallel horizontal spirally-coiled or screw-formed bars N, arranged vertically in line with each other and adapted to simultaneously engage the cornstalk, the one at the lower end and the other the stalk at the upper end thereof. Each coil is mounted to revolve freely in an open frame composed of four parallel bars O O, the pair which are on the same side of the vertical center of the coil being connected together near their front and rear ends, respectively, by two bent bars $o$ $o$. The said bars $o$ upon the same side are pivotally attached to the inner sides of the vertical posts of two oblong open frames P and P$^2$, the former being the front and the latter the rear frame, composed each of two long parallel vertical rods that are preferably tubes or pipes.

The front ends of the bars O and O extend in front of the cutting-point and flare outwardly to readily admit the standing corn, and those parts that are connected together by the bars $o$ are also connected at their front ends by V-shaped rods $o'$. The similar pairs of the bars O and O of the two reel-frames on the same side of the machine are united by vertical rods $o^2$, that are secured to the rods $o'$, as best shown in Fig. 4. Said rods $o^2$ aid in preserving the coils of each reel in perfect parallelism, and each is preferably braced by a rod $o^3$, that projects upward from the bar M and has at its upper end an eye which encircles said rod $o^2$.

For revolving each coil a roller Q is mounted upon a shaft $q$, journaled in bearings upon the frames P and P$^2$ parallel with the axis of the coil, which roller is provided on its periphery with a spirally-extending series of radial pins or teeth $q'$, that engage a like series of openings in the coil. The roller Q not only revolves the coil, but also maintains it against longitudinal movement, as will be readily perceived.

For convenience the description of the construction of the reel mechanism will hereinafter be applied only to the mechanism at one side of the machine, inasmuch as both are identical.

The upper and lower rollers are geared together, so that the two coils will move in unison, the manner of connecting them being a bevel-pinion $q^2$ on the rear end of the shaft of the lower roller that meshes with a like pinion $q^3$ on the lower end of a forwardly and upwardly inclined shaft R, supported by two frames M$^5$, and having on its upper end a bevel-pinion $q^4$, that meshes with a like pinion $q^5$ upon the front end of the upper roller-shaft. This last-named pinion is utilized to drive the cutter L, and for this purpose it gears with a pinion $q^6$ on a short inclined shaft $q^7$, that is connected by a universal joint with the upper end of a vertical shaft $l^3$, that is connected at its lower end in a like manner with the cutter-shaft $l$.

The rear end of the lower roller-shaft $q$ is connected by a universal joint with the front end of a downwardly and rearwardly extending shaft S, that at its rear end has a bevel-pinion $s$, that meshes with and is driven by a pinion $j$ upon the end of the shaft J.

The reel-frame P$^2$ is adapted to swing horizontally, being pivoted at its lower end at $p$ to one of the main-frame bars C' and at its upper end at $p^5$ to a horizontal bar T, supported upon the upper ends of two vertical posts T' T', rising from the main frame at opposite sides of the machine. The reel and knife can thus be swung horizontally to conform to the corn-row. Said reel-frame can be left free to be swung by a stirrup $m$, attached to each front frame P, or they may be adjusted to such position as may be desired and there secured, as by means of a bar or rod U, secured to the caster-wheel head and to the front frame P.

For lowering and raising the front ends of the reels to vary the height at which the knives L cut, a lever V is pivoted to the cross-bar T, having two forward extensions $v$, which are respectively connected to the two front frames P of the two reels, the connection in each instance being a V-shaped rod W and a short section of chain $w$. To the rear end of the lever V a length of chain $v^2$ is connected, by means of which said lever may be operated to adjust the reels up or down, and the same secured as adjusted by securing the chain to a cross-bar $v'$, attached to two brace-rods $t$ $t$ for the bar T, that arise from the main frame.

It will of course be understood that the rear frame P$^2$ is not moved during the described movements up and down of the other parts, and that it is upon the pivotal connections of the latter with said rear frame P$^2$ by the rear bars said movements take place.

To permit the various adjustments described, the shafts $l^3$, R, and S are made telescopic, as shown, and at necessary points universal joints are provided in the shafting. The bars O of the reel-frames are connected to rigid connecting-pieces $o$, which are pivoted to the frames P P$^2$, and thus allow the parallel movement between the upper and lower frames and at the same time preserve the constant distance of the bars O of the same frame from each other.

A driving-rein guide $m'$, consisting of a V-shaped horizontal plate pivoted to the top of each front frame P, is provided to carry the reins clear of the mechanism. The lower ends of cut stalks are supported in a shallow trough or guideway X, supported between the uprights of the two frames P P² of each reel, as said stalks are carried rearwardly by the coil for delivery to the shocking and binding mechanism. The front end of said trough X is secured to the front frame P, so as to rise and fall therewith, while its rear end simply rests upon the cross-bar forming the lower end of the rear frame P². Just in advance of the front of the said trough are two spring-arms Y Y, attached to the frame M and converging inward and rearward until they intersect at a point just above the place where the knife cuts the stalk. These springs, by impeding the stalk, facilitate the action of the knife, and they also operate to raise low-down corn to an upright position by coöperating as an abutment with the lower coil. Said spring-arms, together with an upwardly-inclined surface Z in front of the trough, serve to guide the corn into the latter. The cut corn passing from the two troughs X is delivered to a binding-platform composed of two tables A², being guided from each reel by curved guide-rods B' and B², that respectively engage the corn at the inner and outer sides, these rods being connected at their rear ends to the vertical framework in any suitable manner.

I will now describe the binder mechanism.

Upon each end of a shaft K is mounted a crank-arm $k$, that is connected by a pitman $k'$ to a crank C², secured to the lower end of a vertical rock-shaft D', journaled alongside of and parallel with each upright T', between a main-frame bar A and the cross-bar T. At a point somewhat above its vertical center said shaft D' has a rearwardly-extending arm $d'$, that at its rear end is pivotally attached to the outer end of an inwardly-extending bar which by the rocking of the shaft D' is adapted to be reciprocated, it being guided and supported in such movement by an arm $d^2$, similar to $d'$, that is pivoted to the upright T' and extended parallel with said arm $d'$.

The two inwardly-extending reciprocable bars E' and E³, together with the mechanism carried by them, constitute the band-securing mechanism proper, and such band consists of wire carried by a spool F', secured to an extension of the arms $d'$ of the bar E³, and thence, passing through a guide-eye $g'$ in the end of a rod G⁴, is carried through the said bar E³ and across the path of the oncoming cut corn to the twisting devices carried by the other bar E'. The rod G⁴ is attached to the adjacent rock-shaft D', but is prevented from moving therewith by being wrapped loosely around it, and so is held rigidly to take slack out of the wire, as the same passes through the eye $g'$, by being hinged or pivoted to said shaft, and having an extension $g^2$, that bears against the rear upright T'.

The bars E' and E³ are both tubular, and within the one carrying the wire-twister there is placed a short tubular casing F², in the upper part of which is secured a horizontal plate G³, having at its front side two depending lugs $g^7$. Journaled in openings in the lugs are two disks H' and I', between which is placed a toothed wheel J'. The disk H' is attached fixedly to a bevel-gear K', and connecting the same and the two disks and wheel J' is a pin L', having a square head that engages a like opening in the face of the gear and a pin that engages the outer side of the disk I'. The toothed wheel J' is free to revolve on the pin relative to the two disks for a purpose which will presently appear. Within each of the disks H' and I' and the gear K' is cut a deep radial slot that is adapted to aline with the space between two of the teeth of the wheel J', said slots being designed to receive two portions of the wire for twisting the same, one of which portions is the free end held between the side of the disk H' and a grooved surface in the side of a tooth of the said wheel J', and the other of which portions consists of the wire at the inner end of the other or wire-carrying bar E³. The latter at its inner end carries a plate $e'$, that is in line with the center of the disk and wheels and has a notch or slot $e^2$, that engages the wire and helps to hold it in the slots in the twisting-wheels.

Meshing with the gear-wheel K' is a like gear M', that is carried on the front end of a shaft N', extending lengthwise of the twister-bar E', being journaled at its front end by a plate O', depending from the horizontal plate G³, and at its rear end in a bracket P', secured to the under side of said bar E'.

The shaft N' extends longitudinally along the inside of the bar E' and is provided with a spiral groove $n'$, that is engaged on opposite sides by pins $r'$, that project from a collar R', placed in a slot in the bracket P', and thereby held from longitudinal movement when such movement is given to the shaft. A pawl $r^2$, engaging a shoulder $r^3$ on said collar R', prevents it from rotating in one direction, and hence it will be apparent that by moving the shaft longitudinally through the collar said shaft will be rotated. To thus move the shaft, the following means are employed: Secured to the lower side of the casing F² is a horizontal bar S', having at its rear end a short vertical extension $s'$. Near its front end said bar carries a pin $s^2$, that projects above and below the same, the portion projecting below being adapted to enter a hole $e^3$ in the bar E', and thus hold the casing F² and connected parts. The pin $s^2$ is fastened in the opening in the bar S' in any suitable manner, the particular way being immaterial. As here shown, the pin is driven through the bar and held by frictional contact, so that when the outer end of the bar S' is raised the pin will be raised out of the hole $e^2$, leaving the parts of the twister free to slide. The bar S' is pivotally secured to said casing, so as to admit of its being rocked to raise and lower the pin $s^2$, and is normally held with the pin in the casing-hole by a flat spring $s^3$. The bar is moved in opposition to the spring to lift the pin by being engaged by the front end of the plate $e'$ of the wire-carrying bar $E^3$, and the pin on being so lifted has its upper end engaged with an opening $e^4$ in said plate. It will therefore be seen that the plate $e'$ is thus positively connected with the twister-casing $F^2$, and hence the latter and all connected parts must move longitudinally backward and forward therewith as said plate $e'$ is moved by its bar $E^3$. The revolution of the twister devices is effected on the inward movement of said parts. On the reverse movement no revolution of the shaft N' occurs, as the collar R' is free to revolve, because the dog or pawl $r^2$ slips freely over the shoulder $r^3$.

To cut the wire and secure the free end after the twisting has been performed, the toothed wheel J' is moved relative to the two disks H' and I' by means of a pawl $t'$, carried by an arm $T^5$, pivoted to the top of a plate $G^3$ and having two lugs $f^3$ on its upper side that engage a rod U', secured to the inner side of the bar E', which rod has at its inner end an inclined offset $u'$, that operates to swing said arm $T^5$ to actuate the pawl. The movement of the wheel J' thus caused of course occurs after the twisting has been finished, and the disks H' and I' are held from turning at this time by extending the groove $n'$ of the shaft N' in a straight line, as shown at $n^2$. Supplementing the latter, a lug $n^3$ is on the shaft N', which engages a bifurcated extension $p^2$ of the bracket P'.

Back rotation of the wheel J' is prevented when the pawl $t$ is carried backward by the arm $T^5$ by a pawl $h'$ on the face of the disk H' adjacent to said wheel J', whose free end engages with the teeth of the latter in a manner similar to that of the ordinary pawl-and-ratchet mechanism. To permit the escape of the binding-wire from these cutting and twisting devices, the face of the disk H' adjacent to the wheel J' is cut away at $h^2$ at its periphery for about three-fourths of its circumference.

The friction of the pawl-plate against the wheel J' prevents any backward movement of the wheel, while the forward rotation, except at certain predetermined times, is controlled by the pawl $t'$.

The twister-bar E' is slotted longitudinally at $e^5$ to permit the passage of the wire. Each bar E' and $E^3$ has attached to its rear side a horizontal substantially semicircular-shaped curved bar V', that is adapted to embrace the shock to be bound as the bar moves inward and serves to compress and hold the shock while it is being bound.

The two dropping platforms $B^6$ $B^6$ are attached at their front edges to a rock-shaft W', journaled in brackets attached to the rear main-frame bar C', and, in the manner to appear, are tilted downward when the shock is bound and the wire cut to discharge the shock from the machine. Preferably each platform is provided with an upturned end, as shown, to confine the loose corn as it is accumulated thereon for binding.

For throwing the binding mechanism in and out of gear at the proper time the following-described means are employed: The gear-wheel I on the shaft K is loose thereon and is provided upon one face with a clutch-collar X', that is adapted to engage a clutch-collar Y', slidingly mounted upon the shaft, so as to turn therewith in the customary manner. A coiled spring $x'$, interposed between the two collars, tends to disengage and keep them disengaged. A bell-crank lever Z', having one arm engaging a radial arm $y'$ on the sliding collar Y', is adapted to be actuated through a foot-lever $A^3$ to move said collar into engagement with the clutch-collar on the gear-wheel and thus connect the latter to the shaft. Said sliding collar Y' is held in such engagement for one revolution by a non-rotary disk $B^4$, arranged concentric with the shaft, that is, adapted to coöperate with a lug $y^2$ on the arm $y'$. A single revolution of the shaft K is sufficient to actuate the binder mechanism, and upon the completion thereof the clutch-collar Y' is automatically disengaged from the wheel I by the spring $x'$, longitudinal movement of the said collar being possible at such times by the lug $y^2$ coming into alinement with a notch or recess in the side of the disk $B^4$. The foot-lever $A^3$, it will be seen, is employed simply to disengage the lug from the notch and place the clutch-collars in mesh.

To drop and raise the dropping platforms, the rock-shaft W' is provided with a radial arm $w'$, that is connected by two parallel bars $w^2$ with a lever $w^3$, pivoted to one of the main-frame bars C'. A foot-lever $C^2$ is connected to the front ends of the bars $w^2$ and affords means whereby the platforms may be raised, and they are held in such position by a pivoted arm $D^2$, having a hook or lug $d^2$, that engages a pin $w^4$, attached to the bars $w^2$.

Two dropping platforms $B^6$ are shown and turned at an angle to the machine, so that the shock will be equally supported between them and discharged to one side of the center of the line of draft.

As the cut stalks are moved backward they pass between the curved arms $B^2$ and the bent elastic rods $B^8$, and these rods $B^8$ serve to keep the shock in two parts until the binding mechanism comes into play, when these two rods are pressed together, and the friction of the rear bent ends of these rods upon the shock as it is pushed backward prevents it from being jolted or thrown prematurely from the machine.

The arm $D^2$ is in the path of a radial lug $Y^3$ upon the collar Y', and when engaged thereby at the completion of the revolution of the shaft K is disengaged from the pin $w^4$ to permit the platforms to drop to discharge the bound shocks.

To positively eject the shock, a rod $E^2$, having its upper end bent into a ring form for engaging the shock, is connected adjustably to a tubular lever $f^7$, that is pivoted between the bars $w^2$ and is connected by a link $G^2$ with the crank-arm of rock-shaft W'. By this construction it will be seen that while moving with the platforms the ejector-rod will move faster than they, and thus act to forcibly shove the shock off the same.

To control the movements of the entire harvesting mechanism, an ordinary clutch is provided, as shown, upon the axle B.

With the bars E' and $E^3$ in the position shown in Fig. 1 there is a space between their inner ends, across which, in the path of corn passing rearward from the two troughs X X, is stretched the binding-wire, which passes from the spool through one of said bars to the twister mechanism in the other bar, by which its ends are held. As the corn accumulates the wire yields rearwardly before the same, and when a sufficient amount has been collected the operator, by means of the treadle $A^3$, throws the binder mechanism into gear, as heretofore described. The bars E' and $E^3$ then move toward each other and causing the compression of the shock by the bars V' encircle the same by the wire. The movement of the bars E' and $E^3$ toward each other being continued, the bar $E^3$ enters the other, and the two portions of the binding-wire being placed in the radial slots of the rotary twister devices the end of the plate e' trips the latch $s^2$ and releases the casing $F^2$ from the bar E'. The casing $F^2$ being now free to move, and being connected by the latch $s^2$ with the plate e' of bar $E^3$, is carried along with the latter, and such movement, by means of the spirally-grooved shaft N', the collar R', and the bevel-gear M', causes the gear K' of the twister devices to be revolved, and thus the revolution of the latter to cause the wire to be twisted. The twisting being finished before the completion of the inward or telescoping movement of the bars E' and $E^3$ is completed, the remainder of such movement is employed to cause the severance of the wire, which is done by the partial turning of the wheel J' relative to the two disks H' and I', said wheel J' being thus moved by the pawl t', that is actuated by the swinging of the arm $T^5$ by the engagement therewith of the bar U'. The wire being now cut, the reverse movement of the bars E' and $E^3$ takes place to separate them and to restore the twister mechanism in position for operation upon a new shock.

The bound shock is discharged from the machine by the tilting of the platform and rearward movement of the ejector $E^2$, operated as hereinbefore described.

Having thus described my invention, I claim—

1. In a corn-harvester, the parallel bars, O, connected in pairs in the same vertical plane, combined with the horizontal coils, N, supported by and revolving between the rods, O, and a mechanism for revolving the coils, substantially as described.

2. The two upright frames, P $P^2$, the rear one of which is pivoted so as to have a turning movement, the two sets of bars, O, connected in pairs in the same vertical plane by vertical plates which are pivoted to the uprights, the rods, o', for connecting the front ends of the rods, O, in pairs, and the rods, $o^2$, for connecting two of the pairs of rods together at their front ends, combined with the spirally-coiled bars, N, supported by and revolving between the rods, O, and a mechanism for revolving the coils, substantially as set forth.

3. In a corn-harvester, the two pairs of uprights, P $P^2$, the rear one of which is pivoted so as to have a partially-turning movement, a plurality of sets of bars, O, connected in pairs in the same vertical plane, by vertical plates which are pivoted upon the uprights, the rods, o', for connecting the front ends of the bars in pairs, the rods, $o^2$, for connecting the pairs of rods on one side, the rods, $o^3$, and the bars, M, combined with the spiral bars, N, supported by and revolving between the bars, O, and the rollers, Q, for revolving the spiral bars, substantially as specified.

4. In a corn-harvester, the two uprights, P $P^2$, the rear one of which is pivoted so as to have a partially-turning movement; the frames composed of horizontal rods, O, connected in pairs in the same vertical plane by vertical plates which are pivoted upon the uprights; the spiral revolving bars supported in the frames, and the revolving rollers for revolving the spiral rods, combined with the cross-bar, T, the lever, V, pivoted thereon, and the wires, W, connected to its front ends, and to the front uprights, substantially as shown.

5. In a corn-harvester, the bar, E', the short endwise-moving tubular casing placed therein, means for moving the casing endwise in the bar, a latch, $s^2$, for locking the casing in position in the bar, means for releasing the latch, the grooved shaft, n', having one end journaled in the casing, the disk, I', the pinions, M' K', the pin, L', which passes through the pinion, K', and disk, I', connecting them rigidly, and the wheel, J', placed loosely upon the pin, L', combined with a pawl, t', for engaging the wheel, J'; the arm, $T^5$, pivoted upon the plate, $G^3$; the bent rod, U', slidingly connected at one end to the arm, the ring, provided with pins for catching in the grooves of the shaft, and the bracket, P', through which the end of the shaft passes, substantially as described.

6. In a corn-harvester, the ejector-rod $E^2$, having its upper end bent into a ring form, and the tubular lever $f^7$ pivoted near its lower end, the arms $w'$ and $w^3$, the bars $w^2$ to which the lever is pivoted, and the link $G^2$ loosely connected to both the lower end of the lever and to the arm $w'$ combined with the binding-platform, substantially as set forth.

7. In a corn-harvester, two open horizontal frames placed one above the other in the same vertical plane, and each frame divided into two parts which are connected at their front ends by suitable jointed rods, and two vertical supporting-frames, the rear one of which is pivoted, and upon which supporting-frames the horizontal frames are pivotally supported, combined with the cutting mechanisms placed just back of the front ends of the horizontal frames which have both a lateral and a vertical adjustment, and a mechanism for adjusting the parts vertically, substantially as specified.

8. The shaft, K, provided with the cranks, $k$, the pitmen, $k'$, connected to said cranks, and the cranks, $C^2$, secured to the lower end of the partially-revolving shafts, D', combined with the vertical partially-turning shafts, D', provided with the supporting-arms, $d'$, the uprights, T', provided with supporting-arms $d^2$, pivoted thereto, the two hollow reciprocating bars, $E'$ $E^3$; the wire-reel, F', and the tension-rod, $G^4$, for the wire; one of the reciprocating bars being provided with a twisting mechanism which is operated by the other bar through which the wire passes, and which wire-conducting bar enters into the bar which carries the binding mechanism, substantially as shown.

9. In a binder the bar E', and a sliding twisting mechanism placed therein, combined with the disk R' provided with the pin $r'$, the shaft N', provided with the spiral groove $n'$, and longitudinal groove $n^2$, the pawl $r^2$, and shoulder $r^3$, the bracket P', and a cutting device for cutting the binding-wire while the twisting mechanism is held against rotation by the groove $n^2$, substantially as specified.

10. In a harvester, the bar, E', the short endwise-moving tubular casing, $F^2$, the latch, $s^2$, for locking the casing in position, means for releasing the latch, the twisting mechanism, and means for moving the twisting mechanism endwise, combined with the spirally-grooved shaft, N', the pinion, M', secured to the end of the shaft; the bracket through which the shaft passes and which is provided with the bifurcated extension, $p^2$, the lug, $n^3$, on the shaft and which catches in the extension, $p^2$, the ring, R', provided with pins to catch in the grooves of the shaft, the bent rod, U', the arm, $T^5$, operated by the rod, a pawl attached to the arm and the cutter-wheel, operated by the pawl, substantially as specified.

11. In a harvester, the bar, E', the tubular casing, $F^2$, slidingly placed therein, the bar, S', provided at its rear end with a short vertical extension, $s'$, the pin, $s^2$, carried by the bar and which projects above and below it, and the spring, $s^3$, combined with the bar, $E^3$, of smaller diameter than the one, E', and provided with the plate, $e'$, having the hole, $e^4$; the bar, E', being provided with the hole, $e^2$, to receive the latch, substantially as shown.

12. In a harvester, the two endwise-moving bars $E'$ $E^3$ which approach each other, one carrying the wire and the other the twisting mechanism, combined with the curved compressor-bars which are secured to said bars $E'$ $E^3$, and move therewith to compress the shock, substantially as shown.

13. In a harvester, the shock-receiver, the rocking shaft W', the frame C, cross-bars C', the two arms $w'$, $w^3$, and the two parallel bars $w^2$, combined with the foot-lever $C^2$ pivoted upon the bar C, and connected to the bars $w^2$, the pivoted arm $D^2$ provided with a shoulder to catch over a projection on one of the bars $w^2$, the collar Y', provided with a radial lug $y^3$, the operating-shafts, and the gears placed thereon, substantially as set forth.

14. In a harvester, the vertical shafts $l$, $l^3$ connected slidingly together, the cutter L, secured to the lower end of the shaft $l$, the short inclined shaft $q^7$, connected by a universal joint with the shaft $l^3$, provided with a pinion $q^6$ and the two roller-shafts $q$, $q$, having gears $q^2$, $q^5$ combined with the toothed rollers Q, placed on the shaft $q$, pivotal bearings for the shafts, the rearwardly-inclined telescopic shaft R, provided with pinions $q^3$ $q^4$, the uprights P $P^2$, the frames O, pivoted to the uprights, and means for raising and lowering the front frames, substantially as specified.

15. In a corn-harvester, the two rear pivoted vertical frames, having a horizontal turning movement; the two front vertical frames, two conveying-frames open at their front ends and placed vertically one above the other, and each one divided into two parts and supported pivotally upon the vertical frames; rods for connecting the front ends of the bars in each frame, and rods for connecting the front ends of the frames; and a mechanism for raising and lowering the front ends of the frames, combined with the spiral conveyers supported by and revolving in the conveyer-frames, means for causing the conveyers to revolve simultaneously; and cutting mechanisms located back of the open ends of the frames, substantially as set forth.

16. In a corn-harvester, the binding-platforms, and the two endwise-moving hollow bars, $E'$ $E^3$, adapted to move toward each other, combined with the wire-spool, a guide for the wire which passes through one of the bars, a sliding twisting mechanism placed in the opposite bar, a spirally-grooved shaft geared to the twisting mechanism, and a disk through which the shaft moves back for the purpose of causing it to revolve, substantially as shown.

17. The binding-platform, combined with the two endwise-moving bars, $E'$ $E^3$, one of which has a twisting mechanism placed therein, and which mechanism is adapted to be moved back and forth in its bar; the other bar, E³, having means for attachment to the twisting mechanism and being adapted to enter the bar, E′, which carries the twisting mechanism, and force the mechanism back and forth for the purpose of operating it, substantially as described.

18. The two endwise-moving bars, E′ E³, of unequal diameter so that the one, E³, can enter the other; the bar, E³, having the binding-wire to pass through it, and provided at its inner end with a perforated plate, combined with the larger bar, an endwise-moving twisting mechanism placed therein, and a latch that both locks said mechanism in place and engages with the perforated plate in the other bar, substantially as set forth.

19. In a binding mechanism, a bar adapted to move endwise, a twisting mechanism placed therein and adapted to be moved back and forth, an endwise-moving spirally-grooved shaft connected to the twisting mechanism, a stationary bearing through which the shaft moves, and means in the bearing for engaging the spiral grooves, combined with a second bar of smaller diameter, and which is adapted to be forced into the larger one, and provided with means for first unlocking the twisting mechanism, then forcing it inward for the purpose of operating it, and then drawing it back into position again, substantially as shown.

In testimony whereof I affix my signature in presence of two witnesses.

TIFFANY J. BROCKWAY.

Witnesses:
 A. T. WHITWORTH,
 M. E. McSHARRY.